United States Patent [19]

Takahashi et al.

[11] Patent Number: 4,918,977

[45] Date of Patent: Apr. 24, 1990

[54] LIQUID LEAKAGE DETECTOR LINE

[75] Inventors: Yasuhiko Takahashi, Nara; Kunimitsu Tamura, Higashiosaka; Nagato Niimura, Urawa; Keizo Asao, Matsubara; Teruyosi Honoki, Higashiosaka; Tadaaki Masui, Osaka; Masuo Ishizaka, Higashiosaka, all of Japan

[73] Assignee: Tatsuta Electric Wire and Cable Co., Ltd., Osaka, Japan

[21] Appl. No.: 103,478

[22] Filed: Sep. 30, 1987

[30] Foreign Application Priority Data

| Sep. 30, 1986 | [JP] | Japan | 61-151258[U] |
| Sep. 30, 1986 | [JP] | Japan | 61-151259[U] |
| Sep. 30, 1986 | [JP] | Japan | 61-151260[U] |
| Sep. 30, 1986 | [JP] | Japan | 61-151261[U] |
| Sep. 30, 1986 | [JP] | Japan | 61-151262[U] |
| Sep. 30, 1986 | [JP] | Japan | 61-151263[U] |
| Nov. 13, 1986 | [JP] | Japan | 61-174698[U] |

[51] Int. Cl.$^5$ .................................. G01M 3/18
[52] U.S. Cl. ........................ 73/40.5 R; 174/11 R; 324/541
[58] Field of Search .............. 73/40.5 R; 340/605; 324/539, 541; 174/11 R, 115

[56] References Cited

U.S. PATENT DOCUMENTS

| 3,981,181 | 9/1976 | Ochiai | 73/40.5 R |
| 4,029,889 | 6/1977 | Mizuochi | 174/11 R |
| 4,206,632 | 6/1980 | Suzuki | 73/40.5 R |
| 4,487,057 | 12/1984 | Lutz | 73/40.5 R |
| 4,570,477 | 2/1986 | Sugibuchi | 73/40.5 R |
| 4,645,868 | 2/1987 | Suzuki | 174/115 X |

Primary Examiner—Hezron E. Williams
Assistant Examiner—Joseph W. Roskos
Attorney, Agent, or Firm—Jordon and Hamburg

[57] ABSTRACT

The present invention relates to a liquid leakage detector line for detecting the leakage, if occurs, of a liquid such as sulfuric acid or strong alkali from a transportion pipe line or a storage tank. The liquid leakage detector line comprises: a pair of wiry electrodes each including a conductor covered with an insulator layer made of macromolecular material including an ester bond, the wiry electrodes being disposed substantially in parallel with each other; and a liquid-absorbent material covering these wiry electrodes. The liquid-absorbent material may be a braided body layer made of liquid-absorbent yarn which is disposed outside of the pair of wiry electrodes, or may be a braided body layer similar to the first-mentioned braided body layer which is disposed at the outer periphery of each of the wiry electrodes. If a sulfuric acid or alkali liquid leaks, the liquid-absorbent material covering the wiry electrodes absorbs such leakage liquid. The liquid thus absorbed causes the insulator layers to dissolve to short-circuit the conductors. The insulation resistance between the conductors is measured from one end of the liquid leakage detector line. The decrease in insulation resistance is detected to detect liquid leakage.

18 Claims, 11 Drawing Sheets (B)

LIQUID LEAKAGE DETECTOR LINE

Background of the Invention

1. Field of the Art

The present invention relates to a liquid leakage detector line for detecting the leakage of a liquid such as sulfuric acid, caustic soda, etc., resulting from damage of a transportation pipe line or a storage tank for such liquid.

2. Prior Art

There is not known a detector element in the form of a line for detecting the leakage of a liquid such as sulfuric acid. There are known liquid leakage detector lines for detecting the leakage of oil, water and the like. However, a conventional oil leakage detector line cannot detect the leakage of sulfuric acid or the like, whereas a conventional water leakage detector line cannot be used outdoors because such detector is actuated by rainwater or the like.

It is therefore required that service persons regularly patrol and visually check such pipe line or tank for liquid leakage.

Such patrol and visual check of pipe line and storage tank of a strong acid or strong alkali liquid requires much labor and involves a risk of provoking a serious accident if the discovery of leakage is delayed.

OBJECTS OF THE INVENTION

In view of the foregoing, the present invention is proposed with the object of providing a detector member in the form of a line capable of reliably detecting the leakage of a liquid such as a strong acid or strong alkali liquid in a wide area without erroneous actuation due to rainwater or the like even if used outdoors.

SUMMARY OF THE INVENTION

In order to achieve the object above-mentioned, the present invention provides a liquid leakage detector line comprising:

a pair of wiry electrodes disposed substantially in parallel with each other, each wiry electrode including a conductor covered with an insulator layer made of a macromolecular material including an ester bond

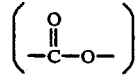

and a liquid-absorbent material covering these wiry electrodes.

In accordance with a first embodiment of the present invention, the liquid-absorbent material may be a braided body layer made of liquid-absorbent yarn disposed outside of the pair of wiry electrodes above-mentioned or may be a braided body layer made of liquid-absorbent yarn disposed at the outer periphery of each of the wiry electrodes.

In accordance with the present invention, the insulator made of a macromolecular material including an ester bond is resin prepared by polycondensation of polybasic organic acids and polyhydric alcohols. A variety of such resins can be prepared dependent on the type of organic acid and alcohol subjected to polycondensation. All resins of such type can be used, but unsaturated polyester resin is particularly preferable.

In accordance with the present invention, the braided body made of liquid-absorbent yarn may be made of, for example, polyester fiber yarn and, preferably, multi-filament polyester fiber yarn.

In the liquid leakage detector line of the present invention, the conductors are covered with the insulator layers adapted to dissolve when the insulator layers come in contact with a strong acid or strong alkali liquid. When the liquid leakage detector line of the present invention is installed by the side of a pipe line or a storage tank, the liquid-absorbent material surrounding the wiry electrodes absorbs the leakage of, for example, sulfuric acid if such leakage occurs. The sulfuric acid thus absorbed causes the insulator layers to short-circuit the conductors. Accordingly, such leakage can be detected by detecting decrease in insulation resistance between the conductors measured from one end of the detector line.

Further, the liquid leakage detector line of the present invention is adapted such that the insulator layers do not dissolve even if water enters the detector line due to rain or the like. Accordingly, this detector line cannot be erroneously actuated when it is used outdoors in a long period of time.

In particular, when a braided body layer made of liquid-absorbent yarn is used as the liquid-absorbent material and is disposed outside of the pair of wiry electrodes or at the outer periphery of each wiry electrode, a good liquid-absorbent ability can be given to detect liquid leakage in a short period of time.

The liquid leakage detector line in accordance with a second preferred embodiment of the present invention comprises:

a pair of wiry electrodes disposed substantially in parallel with each other, each wiry electrode including a conductor covered with an insulator layer made of a macromolecular material including an ester bond; and a braided body layer disposed outside of the wiry electrodes, the braided body layer including an inner braided body layer made of synthetic fiber yarn having liquid non-absorbing properties and an outer braided body layer made of liquid-absorbent yarn.

The braided body made of synthetic fiber yarn having liquid non-absorbing properties may be made of, for example, polyethylene or polypropylene fiber yarn, and, preferably, mono-filament polyethylene fiber yarn.

If sulfuric acid leaks, the outer braided body layer absorbs the leakage sulfuric acid, which is then introduced into the inner braided body layer. In particular, the provision of the inner braided body made of synthetic fibers having liquid non-absorbing properties and non-dissolving properties enables the liquid leakage detector line to hold a large amount of leakage liquid. This increases the reliability in detecting the leakage of a liquid such as sulfuric acid.

The liquid leakage detector line in accordance with a third preferred embodiment of the present invention comprises;

a pair of wiry electrodes disposed substantially in parallel with each other through spacers, each wiry electrode including a conductor covered with an insulator layer made of a macromolecular material including an ester bond; and a braided body made of liquid-absorbent yarn disposed outside of the wiry electrodes.

Each of the spacers may be a braided body layer made of synthetic fiber yarn having liquid non-absorbing properties which covers each of the wiry electrodes, or may be a synthetic resin string having liquid non-absorbing properties.

The liquid leakage detector line of the third embodiment has a distance between the wiry electrodes which is greater than that in the detector line in which the wiry electrodes are disposed without such spacers. This enables one to reduce the capacitance between the wiry electrodes per unit length thereof. There may be formed a circuit in which one end of each wiry electrode is closed by a resistor and the other end is connected in series to a resistor. When a constant alternating voltage is applied to such circuit and a voltage across both ends of the second-mentioned resistor is to be measured, there can be generated a great difference between the applied alternating voltage and a voltage measured at a time of liquid leakage, even though the liquid leakage detector line is long. In other words, the liquid leakage detector line in accordance with the third embodiment can detect liquid leakage with good sensitivity even though such leakage occurs at a remote place.

There is used, as each of such spacers, a braided body made of synthetic fiber yarn having liquid non-absorbing properties or a synthetic resin string having liquid non-absorbing properties. The spacers may be made of, for example, polyethylene or polypropylene fiber yarn or string, and in the case of the fiber yarn, mono-filament polyethylene fiber yarn is preferable.

The liquid leakage detector line in accordance with a fourth embodiment of the present invention comprises:

a pair of wiry electrodes disposed substantially in parallel with each other, each wiry electrode including a conductor covered with an insulator layer made of a macromolecular material including an ester bond;

a braided body layer made of liquid-absorbent yarn disposed outside of the wiry electrodes; and at least one leakage position detector line disposed substantially in parallel with the wiry electrodes and including a conductor covered with an insulator layer made of an acid- and alkali-resisting material.

In this embodiment, it is further preferable that the pair of wiry electrodes and the leakage position detector line are disposed inside of the braided body layer made of liquid-absorbent yarn.

In the fourth embodiment, the insulator layer of an acid- and alkali-resisting material may be, for example, vinyl chloride resin, polyethylene resin, polypropylene resin or urethane resin and, preferably, polyethylene resin.

The liquid leakage detector line in accordance with the fourth embodiment includes the leakage position detector line including the conductor covered with the insulator layer made of an acid- and alkali-resisting material. Accordingly, the liquid leakage detector line of this embodiment can not only detect the occurrence of liquid leakage, but also readily detect the position of such leakage according to the Murray loop test method with the use of this position detector line as a "good" line.

In accordance with a fifth embodiment of the present invention, there may be used, instead of the braided body layer in the fourth embodiment, a braided body layer unit including an inner braided body layer made of synthetic fiber yarn having liquid non-absorbing properties, and an outer braided body layer made of liquid-absorbent yarn.

In accordance with a sixth embodiment of the present invention, there may be used spacers through which a pair of wiry electrodes in the fourth embodiment are disposed.

The liquid leakage detector line in accordance with a seventh embodiment of the present invention comprises;

a pair of wiry electrodes disposed substantially in parallel with each other, each wiry electrode including a conductor covered with an insulator layer made of a macromolecular material including an ester bond; and at least one wiry electrode arranged similarly to the first-mentioned wiry electrodes and disposed substantially in parallel with the first-mentioned wiry electrodes, all of the wiry electrodes above-mentioned having different resistance values per unit length thereof.

The liquid leakage detector line of this seventh embodiment can detect the occurrence of liquid leakage based on the occurence of short-circuit between the wiry electrodes. Since all of three or more wiry electrodes do not have the same resistance values per unit length thereof, there is a wiry electrode which presents an electric resistance value between the starting end of the wiry eletrode and the short-circuit point, which is different from the electric resistance values of other wiry electrodes. Accordingly, the leakage position can be detected readily and accurately by measuring two electric resistances each between two wiry electrodes.

It is to be appreciated that other embodiments of the present invention can be also advantageously adopted.

Further in lieu of the various braided bodies mentioned above, knitted bodies may be employed.

DETAILED DESCRIPTION OF THE PREFERRED EMBODIMENTS

The following description will discuss in detail the present invention with reference to the accompanying drawings showing embodiments thereof.

FIGS. 1 to 5 are views in connection with a first embodiment of the present invention.

Figure 1A:
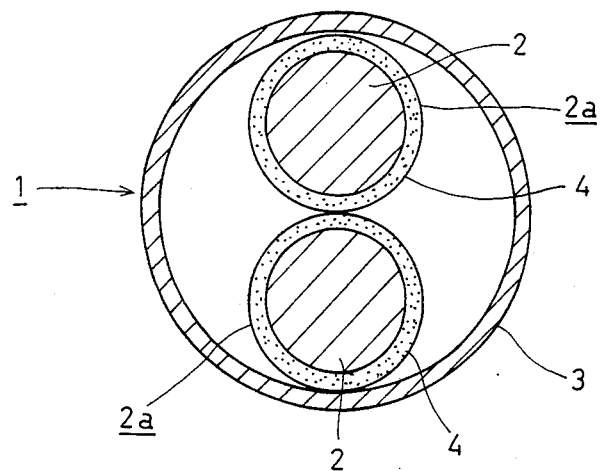
FIG. 1 (A) and (B) are section views of a liquid leakage detector line in accordance with a first embodiment of the present invention.
Figure 1B:
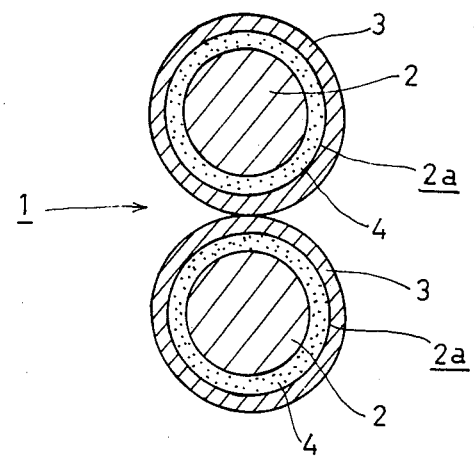

In FIG. 1 (A), a liquid leakage detector line 1 comprises:

a pair of wiry electrodes 2a disposed substantially in parallel with each other and in contact with each other; and a braided body layer 3 made of liquid-absorbent yarn which covers the wiry electrodes 2a.

Each of the wiry electrodes 2a includes a conductor 2 covered with an insulator layer 4 made of polyester enamel.

In FIG. 1 (B), a pair of wiry electrodes 2a of the liquid detector line 1 are formed and arranged in the same manner as in FIG. 1 (A), but a braided body layer 4 made of liquid-absorbent yarn covers each of the wiry electrodes 2a individually.

There were made a liquid leakage detector line example 5 embodying the present invention (hereinafter referred to as the first invention example) and comparative examples 5. With the use of the first invention example 5 and the comparative examples 5, the function of detecting the leakage of sulfuric acid was measured according to the method shown in FIG. 2 as outlined below.

The first invention example 5 includes a pair of wiry electrodes each including a 0.65 mm dia. copper conductor 2 covered with a polyester enamel insulator layer 4 having a thickness of 27.5 μm. The wiry electrodes are disposed substantially in parallel with each other. These wiry electrodes are covered with a liquid-absorbent braided body layer 3 made of 2 groups of 24 units of 4 pieces of 0.085 mm dia. multi-filament Tetron (trademark for polyester synthetic fibers marketed by Teijin Limited and Toray Industries, Inc.) yarn braided for every 4 pieces with a braiding pitch of 8 mm (percent coverage of 91%).

The comparative example I includes a pair of wiry electrodes similar to those in the first invention example 5. The wiry electrodes are arranged substantially in parallel with each other and covered with a braided body layer made of 2 groups of 16 units of 3 pieces of 0.18 mm dia. mono-filament polyethylene yarn braided for every 3 pieces with a braiding pitch of 9 mm (percent coverage of 90%).

The comparative example II was made by two wiry electrodes similar to those in the invention example 5 which were twisted into one piece. The comparative example II does not include the liquid-absorbent braided body layer 3 used in the first invention example 5.

Figure 2:
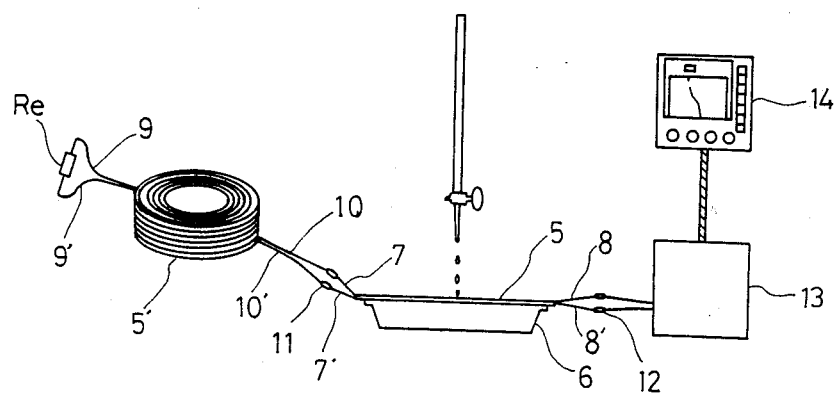
FIG. 2 is a view illustrating how to measure a liquid leakage detecting function.

As shown in FIG. 2, each of the first invention example 5 and comparative examples 5 having a length of 30 cm was placed on a pad 6 with both ends of the conductors 7, 7 and 8, 8 respectively projecting from both ends of each example 5. A detector line example winding 5' having a length of 200 m has conductors of which both ends 9, 9' and 10, 10' project from both ends of the detector line example winding 5'. A terminal resistance Re of 5K ohms is connected to each of ends 9 and 9'. The other ends 10 and 10' are connected to respective ends 7 and 7' of the conductors of each example 5, respectively, with grips 11. The other ends 8 and 8' of the conductors of the example 5 are connected through grips 12 to a liquid leakage detector 13, which is connected to a voltage recording meter 14. A burette was placed above the example 5 at the center thereof. This burette dropped a sulfuric acid solution having a concentration in a range from 70 to 97% at a rate of 0.02 ml/second onto the example 5.

Figure 3:
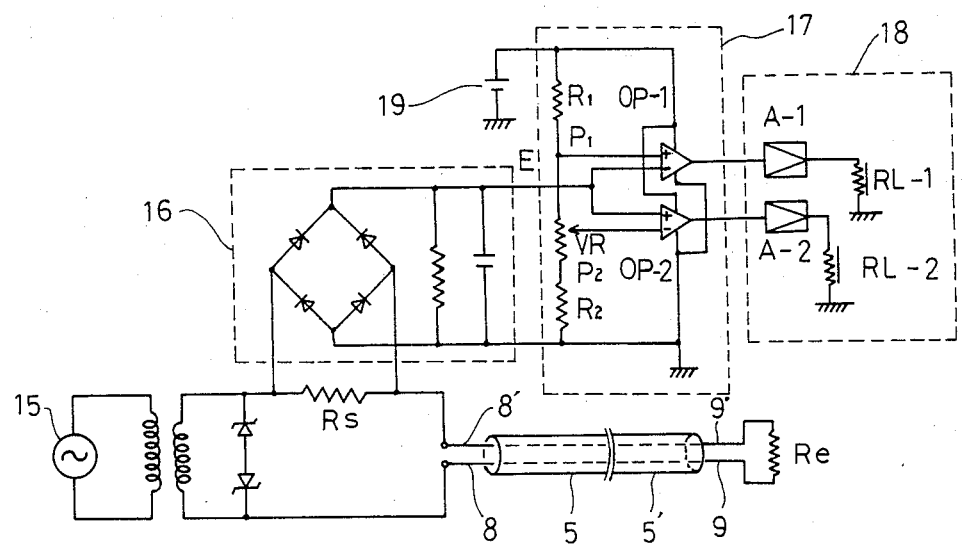
FIG. 3 is a view illustrating an electric circuit of a detector of a liquid leakage detector unit.

The following description will discuss the detector electric circuit of a liquid leakage detector unit 13 for measuring the liquid leakage detector function, with reference to FIG. 3.

In FIG. 3, an AC power supply 15 is connected to ends 8 and 8' of the conductors of the example 5 through a resistance RS connected in series. A rectifier circuit 16 is disposed for rectifying a voltage across the resistance RS. A fault detector circuit 17 is adapted to supply a signal to actuate a relay circuit 18 if a DC output voltage E of the rectifier circuit 16 corresponding to an alternating current flowing across one ends 8 and 8' of the conductors of the example 5, deviates from a predetermined upper and lower threshold level (for example, DC6±3V). When the DC output voltage E exceeds the upper threshold level, this means that the insulation resistance between the wiry electrodes has fallen below the threshold level. On the other hand, when the DC output voltage E is below the lower threshold level, this means that the wiry electrodes have been disconnected and the impedance therebetween has been increased.

The fault detector circuit 17 comprises operational amplifiers OP-1 and OP-2, a DC power supply circuit 19 and a voltage divider circuit for dividing a DC voltage supplied from the DC power supply circuit 19, by registors R1, VR and R2. An upper threshold voltage is supplied from a connection point P1 connecting the R1 and the VR to each other, to a noninverting input terminal of the operational amplifier OP-1, whereas a lower threshold voltage is supplied from a connection point P2 connecting the R2 and the variable resistor VR, to an inverting input terminal of the operational amplifier OP-2.

A voltage E from the output terminal of the rectifier circuit 16 at the positive electrode side thereof is applied to the inverting input terminal of the operational amplifier OP-1 and to the noninverting input terminal of the operational amplifier OP-2. The positive power supply terminals and negative power supply terminals of the operational amplifiers Op-1 and OP-2 are connected to the positive and negative poles of the DC power supply, respectively.

The relay circuit 18 comprises: an amplifier A-1 connected to the output terminal of the operational amplifier OP-1; a relay RL-1; an amplifier A-2 connected to the output terminal of the operational amplifier OP-2; and a relay RL-2.

Figure 4:
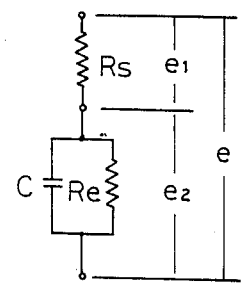
FIG. 4 is a view illustrating a circuit resistance Rs and an equivalent circuit of a detector line.

When each example 5 is connected to the detector electric circuit of the liquid leakage detector unit 13, a circuit formed at the right side with respect to the conductor ends 8 and 8' is a parallel circuit including terminal resistance Re and capacitance C between the wiry electrodes of the example 5, as shown in FIG. 4. There are generated a voltage $e_1$ across the circuit resistance Rs and a voltage $e_2$ across the parallel circuit. Thus, the applied voltage e is divided into the $e_1$ and the $e_2$.

As the length of the detector line becomes longer, the capacitance C between the electrodes of the detector line becomes greater and the AC resistance becomes smaller. Also, the voltage $e_2$ across the parallel circuit of the detector line becomes smaller. A small voltage $e_2$ reduces variations of a voltage across the circuit resistance Rs for liquid leakage detection, resulting in poor detector sensibility.

Figure 5:
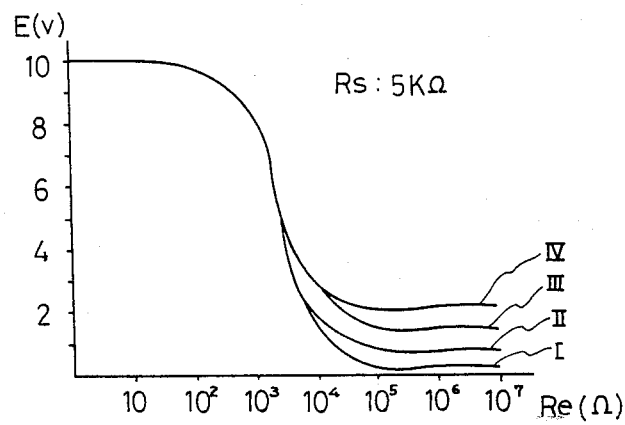
FIGS. 5 to 7 are views illustrating a relationship between a terminal resistance Re and a detector signal voltage across a circuit resistance Rs in a variety of lengths of the leakage detector line.
Figure 6:
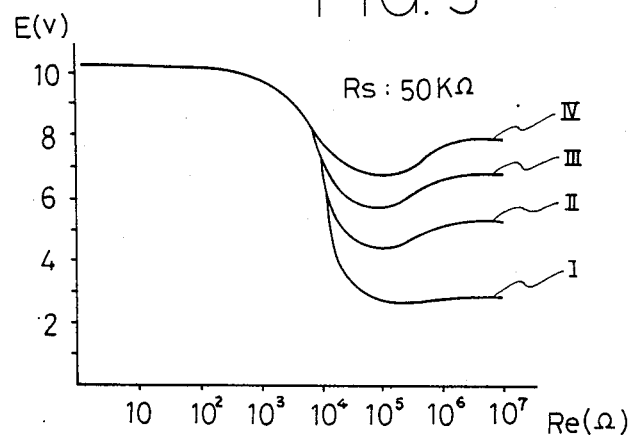
Figure 7:
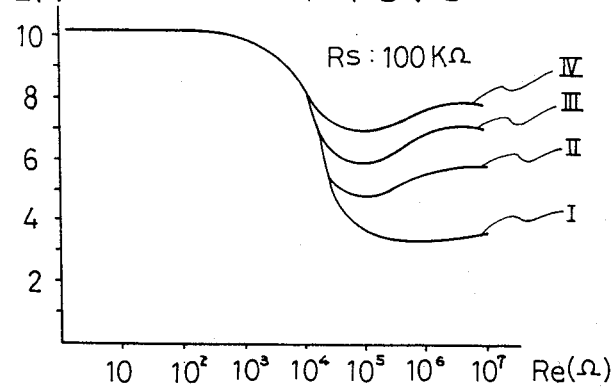

To demonstrate the foregoing, there was obtained a relationship between the terminal resistance Re and the detector signal voltage E across the circuit resistance Rs for each of Rs resistance values of 5K ohms, 50K ohms and 100K ohms in each of a variety of lengths of the liquid leakage detector line (I: 200 m, II: 400 m, III: 600 m and IV: 800 m). The results are shown in FIGS. 5 to 7.

As to the circuit resistance Rs of 5K ohms, it is apparent that the detector signal voltage presents a sharp rising curve with variations of the terminal resistance Re even for the liquid leakage detector line having a length of 800 m, thus providing a good detector sensitivity. Based on this fact, there was measured a detector time (in minutes) in which the signal voltage E reached 7 V. The results are shown in Table 1.

As apparent from Table 1, in the comparative example II formed by the wiry electrodes only and not covered with the braided body, the leakage liquid passed through without stopping at the wiry electrodes, causing the leakage liquid not to come in contact with and not to be held by the wiry electrodes. Accordingly, the comparative example II cannot detect the leakage of a liquid except for a concentrated sulfuric acid having a concentration of 90% or more. The comparative example I formed by the wiry electrodes covered with the polyethylene braided body can detect, in a dry state, the leakage of sulfuric acid having a concentration of 75% or more, since the braided body has liquid non-absorbing properties. However, its detector operation is unstable and lacks reliability. In a wet state, such operation becomes further unstable.

The first invention example formed by the wiry electrodes covered with the liquid-absorbent Tetron braided body, can reliably detect, in both dry and wet states, the leakage of sulfuric acid having a concentration of 75% or more. This demonstrates a practical utility of the first invention example. Although not shown in Table 1, it is found that the first invention example presents the same detection ability as that shown in Table 1, in a 70-day outdoor exposure test and a 60-day immersion test. This proves that the first invention example has weather resistant characteristics and water resistance. It is also found that the first invention example has sensibility of detecting the leakage of caustic soda, similar to that with respect to the leakage of sulfuric acid.

As discussed hereinbefore, the liquid leakage detector line in accordance with the present invention includes the wiry electrodes, each including the conductor covered with the insulator layer which is adapted to dissolve when the insulator layer comes in contact with a sulfuric acid or strong alkali liquid. Accordingly, when such detector line is installed by the side of a pipe line or a storage tank, the leakage of sulfuric acid or the like, if it occurs, cause the peripheral liquid-absorbent braided body to absorb such leakage liquid. By the leakage liquid thus absorbed, the insulator layer covering the conductors dissolves, causing the conductors to be short-circuited to decrease the insulation resistance. By detecting such decrease, liquid leakage can be detected in a wide area.

The detector line in accordance with the present invention can reliably detect potential liquid leakage, eliminating regular patrol and visual check of a pipe line or storage tank for liquid leakage.

Figure 8A:
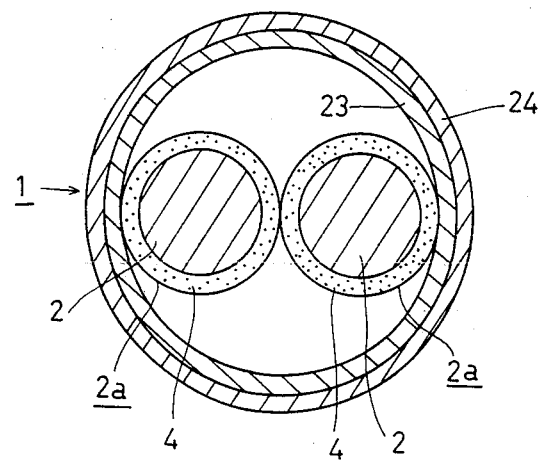
FIG. 8 (A) and FIG. 8 (B) are section views of a liquid leakage detector line in accordance with a second embodiment of the present invention.
Figure 8B:
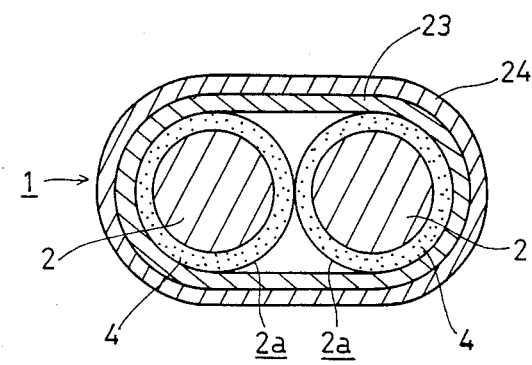

FIG. 8 shows a second embodiment of the present invention. The liquid leakage detector line in FIG. 8 includes:

an inner braided body layer 23 made of synthetic fiber yarn having liquid non-absorbing properties; and an outer braided body layer 24 made of liquid-absorbent yarn;

these inner and outer braided body layers 23 and 24 being disposed at the outer periphery of the liquid leakage detector line shown in FIG. 1 (A).

The detector line in FIG. 8 (A) has a circular section, whereas the detector line in FIG. 8 (B) has an elliptical section.

As in the first embodiment of the present invention, there was made an example 5 of the liquid leakage detector line in accordance with this second embodiment (hereinafter referred to as the second invention example) and this example was tested as to the leakage sulfuric acid detector function according to the method in FIG. 2.

The second invention example 5 includes:

a pair of wiry electrodes similar to those in the first embodiment;

an inner braided body layer having liquid non-absorbing properties 23 made of 2 groups of 16 units of 3 pieces of 0.18 mm dia. mono-filament polyethylene yarn braided for every 3 pieces with a braiding pitch of 9 mm (percent coverage of 90%); and a liquid-absorbent outer braided body layer 24 made of 2 groups of 24 units of 4 pieces of 0.085 mm dia. multi-filament Tetron yarn braided for every 4 pieces with a braiding pitch of 9.8 mm (percent coverage of 91%).

The test results are shown in Table 2. It is apparent from Table 2 that the second invention example 5 can reliably detect, in both dry and wet states, the leakage of sulfuric acid having a concentration of 75% or more, like the first invention example. In the second invention example, the Re - E relationship is substantially identical with that obtained in the first invention example, and therefore measurements were made with the circuit resistance Rs set at 5K ohms.

Figure 9A:
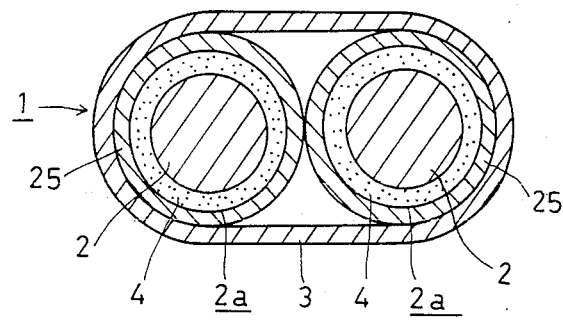
FIG. 9 (A) and FIG. 9 (B) are section views of a liquid leakage detector line in accordance with a third embodiment of the present invention.
Figure 9B:
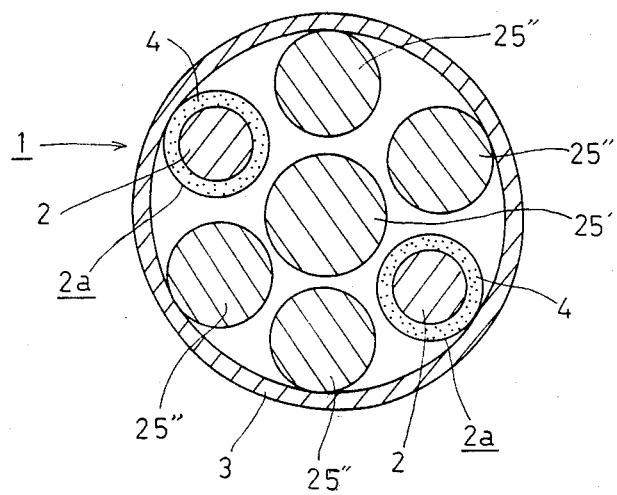

FIG. 9 shows a third embodiment of the present invention. The liquid leakage detector line 1 of the third embodiment comprises:

a pair of wiry electrodes 2a disposed substantially in parallel with each other, each electrode having a conductor 2 covered with a polyester enamel insulator layer 4;

spacers 25 through which the wiry electrodes 2a are disposed; and a braided body layer 3 made of liquid-absorbent yarn disposed outside of the wiry electrodes 2a and the spacers 25.

In FIG. 9 (A), each of the spacers 25 is a braided body layer made of synthetic fiber yarn having liquid non-absorbing properties which covers each wiry electrode. In FIG. 9 (B), the spacers are a plurality of synthetic resin strings 25' and 25" having liquid non-absorbing properties which are disposed between the wiry electrodes.

As in the first and second embodiments of the present invention, there was made an example 5 of the liquid leakage detector line in accordance with the third embodiment of the present invention (hereinafter referred to as the third invention example), and this example 5 was tested as to its leakage sulfuric acid detection function according to the method in FIG. 2.

The third invention example 5 comprises:

a pair of wiry electrodes each including a 0.65 mm dia. copper conductor 2 covered with a polyester enamel insulator layer 4 having a thickness of 27.5 μm;

a spacer 25' made of a 0.9 mm dia. synthetic resin string having liquid non-absorbing properties, the spacer 25' being disposed substantially in parallel with and between the wiry electrodes;

four spacers 25" each having a diameter of 0.7 mm disposed to form a circular shape together with the wiry electrodes and the spacer 25'; and a liquid-absorbent braided body 3 made of 2 groups of 24 units of 4 pieces of 0.085 mm dia. multi-filament Tetron yarn braided for every 4 pieces with a braiding pitch of 10.8 mm (percent coverage of 91%).

As mentioned earlier, as the length of the liquid leakage detector line becomes longer, the capacitance C between the wiry electrodes becomes greater to deteriorate the detecting sensibility.

In this connection, the third invention example includes the spacer 25' made of a synthetic resin string having liquid non-absorbing properties, at the opposite side of which the insulatingly covered wiry electrodes are disposed substantially in parallel with the spacer 25'. The capacitance in unit length can therefore be reduced.

Figure 10:
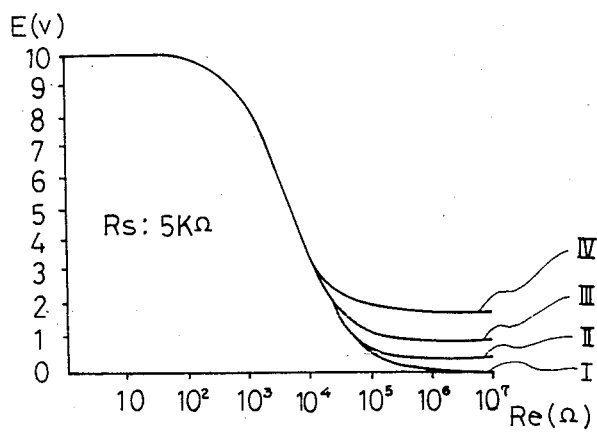
FIG. 10 to FIG. 12 are views illustrating a relationship between a terminal resistance Re and a detector signal voltage across a circuit resistance Rs in a variety of lengths of the leakage detector line.
Figure 11:
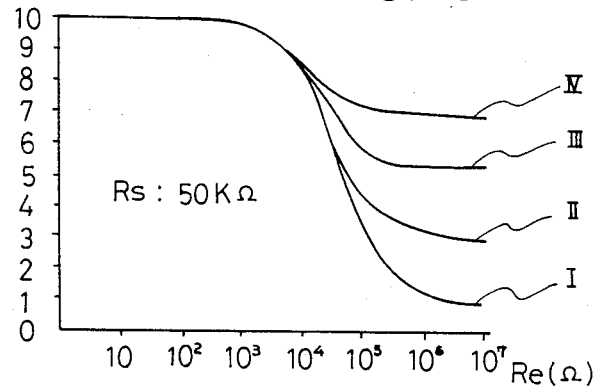
Figure 12:
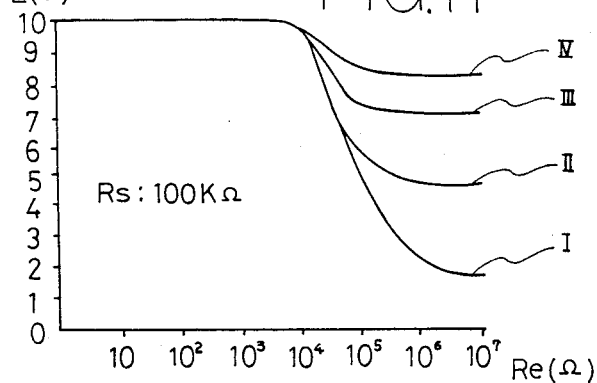

There was obtained a relationship between the terminal resistance Re and the detector signal voltage across the circuit resistance Rs for each of Rs resistance values of 5K ohms, 50K ohms and 100K ohms in each of a variety of lengths of the third invention example 5 (I: 200 m, II: 800 m, III: 2 km and IV: 4 km). The results are shown in FIGS. 10 to 12.

As to the circuit resistance Rs of 5K ohms, it is apparent from these figures that the detector signal voltage presents a sharp rising curve with variations of the terminal resistance Re even for the third invention example 5 having a length of 4 km, thus providing a good detector sensitivity. Based on this fact, a test was conducted, of which results are shown in Table 3.

The liquid leakage detector line of this embodiment can reliably detect, in both dry and wet state, the leakage of sulfuric acid having a concentration of 75% or more. This demonstrates a practical utility of the detector line of the present invention.

It is found that the second and third invention examples present the same detection ability as shown in Tables 2 and 3 even in a 70-day outdoor exposure test and a 60-day immersion test. This demonstrates the weather characteristics and water resistance of these examples. It is also found that these examples have sensitivity of detecting the leakage of caustic soda, similar to that with respect to the leakage of sulfuric acid.

Figure 13:
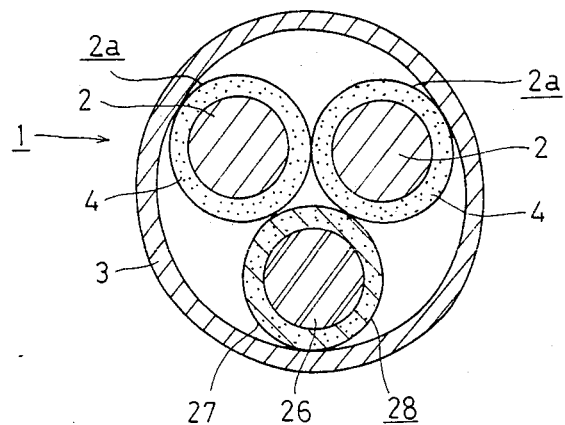
FIG. 13 is a section view of a liquid leakage detector line in accordance with a fourth embodiment of the present invention.

FIG. 13 shows a fourth embodiment of the present invention. The liquid leakage detector line of this embodiment is the same as that shown in FIG. 1 (A) except for the following point.

The fourth embodiment includes a leakage position detector line 28 disposed adjacent a pair of wiry electrodes 2a and substantially in parallel therewith. This line 27 includes a conductor 26 covered with an insulator layer 27 made of an acid- and alkali-resistant material. This leakage position detector line 28 may be disposed outside of a braided body layer 3.

The following description will discuss the preparation of an example of the leakage detector line in accordance with the fourth embodiment (hereinafter referred to as the fourth invention example), and the method of detecting the leakage of sulfuric acid and the position of such leakage with reference to FIG. 14.

The fourth invention example 1 as shown in FIG. 13 comprises:

a pair of wiry electrodes 2a each including a 0.65 mm dia. copper conductor covered with a polyester enamel insulator layer having a thickness of 27.5 μm;

a leakage position detector line 28 including a 0.65 mm dia. copper conductor covered with a polyethylene resin insulator layer having a thickness of 0.15 mm, the leakage position detector line 28 being disposed substantially in parallel with the wiry electrodes 2a; and a liquid-absorbent braided body layer 3 made of 2 groups of 24 units of 4 pieces of 0.085 mm dia. multi-filament Tetron yarn braided for every 4 pieces with a braiding pitch of 11.3 mm (percent coverage of 85%), the braided body layer 3 being disposed outside of the wiry electrodes 2a and the leakage position detector line 28.

The fourth invention example can detect the leakage of sulfuric acid in the same manner as in the invention examples mentioned earlier. The distance between a sulfuric acid leakage point and a measuring point is measured as set forth below.

Figure 14:
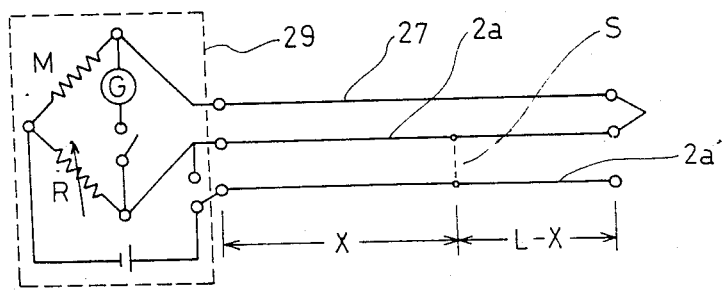
FIG. 14 is a view illustrating a Murray loop test device.

As shown in FIG. 14, the terminal ends of one wiry electrode 2a or 2a' and the leakage position detector line 27 are short-circuited, and the starting ends of the electrodes lines 2a and 2a' and the leakage position detector line 28 are connected to a Murray loop test device 29. If the wiry electrodes 2a and 2a' are short-circuited due to the leakage of sulfuric acid at, for example, a position S, the following equation is established by the connections above-mentioned provided that the bridge is equilibrated:

$$X = 2L \frac{R}{R + M}$$

where

X = Distance between the measuring position and the short-circuit position

L = Length of the leakage detector line

R = Resistance value of the variable resistance arm having one end connected to the position S M = Resistance value of the stationary resistance arm It is found that the fourth invention example presents the same detection ability even in a 70-day outdoor exposure test and a 60-day immersion test, thus proving the weather resistant characteristics and water resistance. It is also found that this example has sensibility of detecting the leakage of caustic soda, similar to the detecting ability of the leakage of sulfuric acid, and further has ability of detecting the position of such leakage.

Thus, this liquid leakage detector line can securely detect the leakage of, and the position of such leakage of, sulfuric acid or strong alkali liquid in a wide area.

Figure 15:
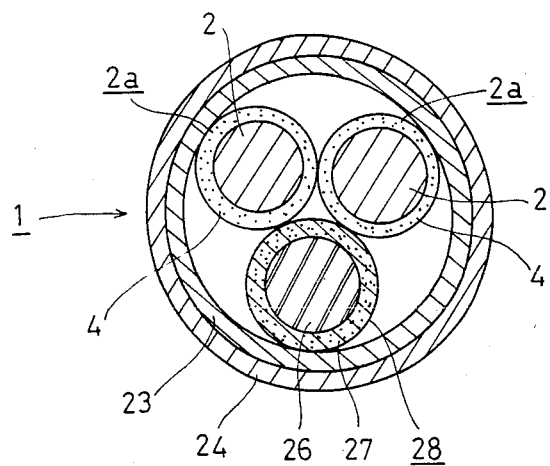
FIG. 15 is a section view of a liquid leakage detector line in accordance with a fifth embodiment of the present invention.

FIG. 15 shows a fifth embodiment of the present invention, which is the same as that of the fourth embodiment except for the following point.

The liquid leakage detector line in accordance with the fifth embodiment has an inner braided body layer 23 made of synthetic fiber yarn having liquid non-absorbing properties and an outer braided body layer 24 made of liquid-absorbent yarn.

There was made an example of this detector line of the fifth embodiment as shown in FIG. 15 (hereinafter referred to as the fifth invention example) and a test was conducted of its detecting ability of the leakage of sulfuric acid or the like, and the position of such leakage according to the method shown in FIG. 14, like the fourth embodiment.

The fifth invention example comprises:
a pair of the wiry electrodes 2a and a liquid leakage position detector line 28 identical with those of the fourth embodiment;

an inner braided body layer 23 having liquid non-absorbing properties made of 2 groups of 16 units of 3 pieces of 0.18 mm dia. mono-filament polyethylene yarn braided for every 3 pieces with a braiding pitch of 14 mm (percent coverage of 84%); and a liquid-absorbent outer braided body layer 24 made of 2 groups of 24 units of 4 pieces of 0.085 mm dia. multi-filament Tetron yarn braided for every 4 pieces with a braiding pitch of 12 mm (percent coverage of 85%). It is found that the fifth invention example can accurately detect the leakage position as in the fourth embodiment.

For example, this fifth invention example detected a leakage detection position of 401 m for an actual measured distance of 400 m.

Figure 16:
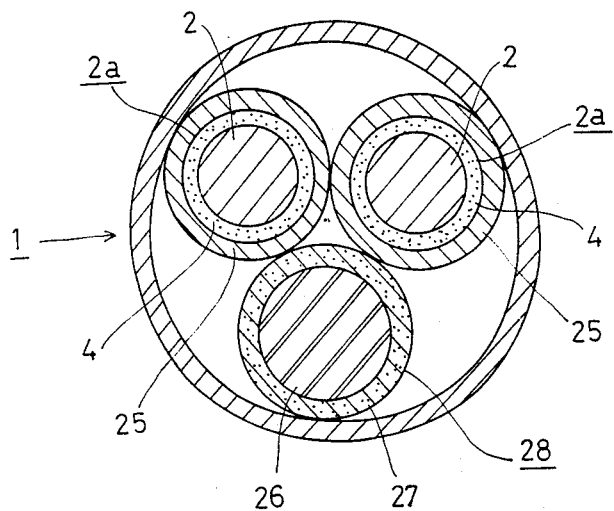
FIG. 16 is a section view of a liquid leakage detector line in accordance with a sixth embodiment of the present invention.

FIG. 16 shows a sixth embodiment of the present invention, which is the same as the fourth embodiment except for the following point.

In this sixth embodiment, each of the wiry electrodes is covered with a braided body layer 25 made of synthetic fiber yarn having liquid non-absorbing properties.

There was made an example of this detector line of the sixth embodiment as shown in FIG. 16 (hereinafter referred to as the sixth invention example) and a test was conducted of its detecting ability of the leakage of sulfuric acid or the like, and the position of such leakage according to the method shown in FIG. 14, like the fourth embodiment.

The sixth invention example comprises:
a pair of wiry electrodes 2a, each including
 a 0.65 mm dia. copper conductor covered with a polyester enamel insulator layer having a thickness of 27.5 μm and
 a braided body layer having liquid non-absorbing properties 25 made of 2 groups of 16 units of 3 pieces of 0.18 mm dia. mono-filament polyethylene yarn braided for every 3 pieces with a braiding pitch of 16 mm, the braided body layer 25 covering the insulator layer above-mentioned;
a leakage position detector line 28 having a 0.65 mm dia. copper conductor covered with a polyethylene resin insulator layer having a thickness of 0.15 mm, the leakage position detector line 28 being disposed substantially in parallel with the wiry electrodes 2a; and
a liquid-absorbent braided body layer 3 made of 2 groups of 24 units of 4 pieces of 0.085 mm dia. multi-filament Tetron yarn braided for every 4 pieces with a braiding pitch of 15.7 mm (percent coverage of 90%), the braided body layer 3 being disposed outside of the wiry electrodes 2a and the leakage position detector line 28.

It is found that the sixth invention example can accurately detect the leakage position as in the fourth embodiment.

For example, the sixth invention example detected a leakage detection position of 2004.5 m for an actual measured distance of 2000 m.

Figure 17A:
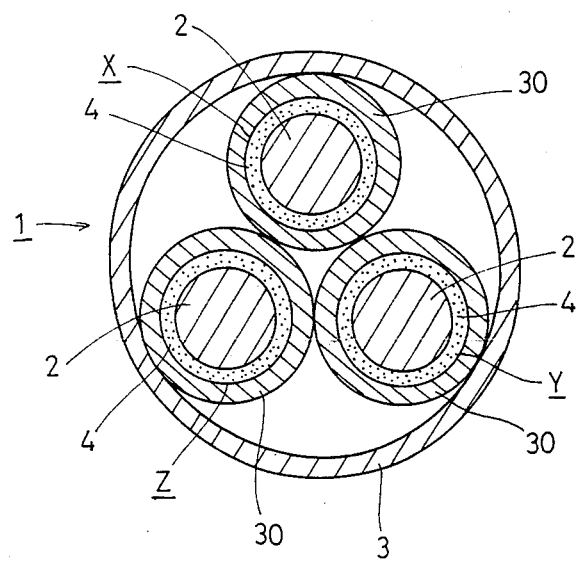
FIG. 17 (A) and 17 (B) are section views of a liquid leakage detector line in accordance with a seventh embodiment of the present invention.
Figure 17B:
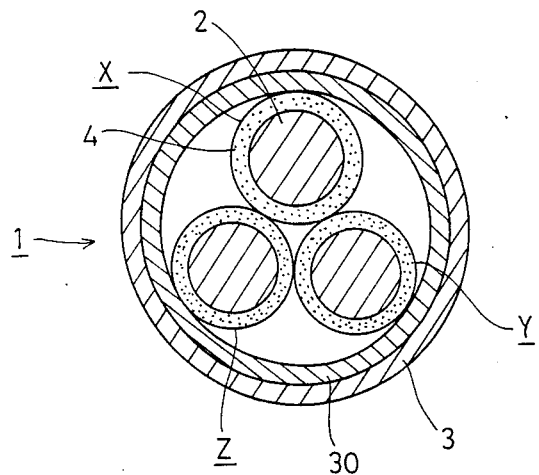
Figure 18:
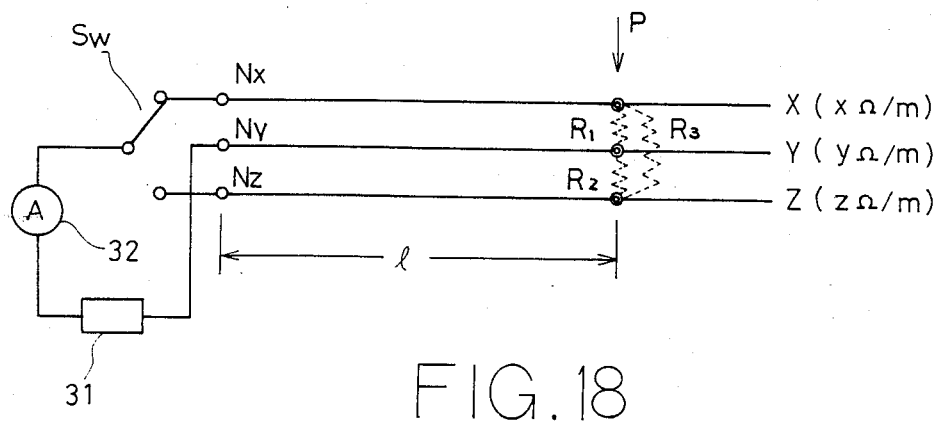
FIG. 18 is a view of an electric circuit illustrating an example employing the leakage liquid detector line shown in FIG. 17.
Figure 19:
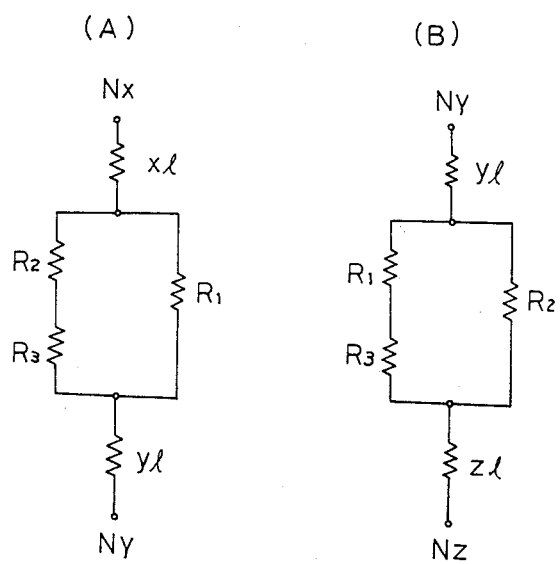
FIG. 19 (A) and 19 (B) are views of an equivalent circuit of a detector line at a time when a leakage resistance occurs in the detector line due to the leakage of sulfuric acid.

FIGS. 17 to 19 show a seventh embodiment of the present invention.

The liquid leakage detector line in FIG. 17 (A) and (B) comprises;
a wiry electrode X including a conductor 2 covered with an insulator layer 4 made of a macromolecular material including an ester bond;
a wiry electrode Y similar to the wiry electrode X;
a wiry electrode Z including a conductor 2' made of a material different from that of the conductor 2 covered with an insulator layer 4 made of a macromolecular material including an ester bond;
a braided body layer 30 made of synthetic fibers having liquid non-absorbing properties; and
a braided body layer 3 made of liquid-absorbent yarn.

The following description will discuss a method of detecting the position of sulfuric acid leakage with the use of the liquid leakage detector line of the seventh embodiment, with reference to FIGS. 18 to 19.

The three wiry electrodes X, Y and Z are disposed substantially in parallel with one another throughout their length. It is now supposed that these lines X, Y and Z respectively have electric resistance values per unit length of the conductor of x ohm/m, y ohm/m and z ohm/m ($x \neq z$) and that the leakage resistance values between the wiry electrodes X and Y, between the wiry electrodes Y and Z and between the wiry electrodes Z and X, at a sulfuric acid leakage point P are $R_1$, $R_2$ and $R_3$, respectively.

It is also supposed that the distance between the respective measuring ends $N_X$, $N_Y$ and $N_Z$ of the wiry electrodes X, Y and Z, and the sulfuric acid leakage point P is expressed as l. Then, a circuit from the measuring end $N_X$ to the measuring end $N_Y$ through the sulfuric acid leakage point P and a circuit from the measuring end $N_Y$ to the measuring end $N_Z$ through the sulfuric acid leakage point P are expressed in terms of equivalent circuits respectively shown in FIG. 19 (A) and (B). The resistance values $R_{XY}$ and $R_{YZ}$ between the measuring ends $N_X$ and $N_Y$ and between the measuring ends $N_Y$ and $N_Z$ are respectively expressed in terms of the following equations:

$$R_{XY} = (x + y)l + \frac{R_1(R_2 + R_3)}{R_1 + R_2 + R_3} \quad (a)$$

$$R_{YZ} = (y + z)l + \frac{R_2(R_1 + R_3)}{R_1 + R_2 + R_3} \quad (b)$$

From the equations (a) and (b) above-mentioned, the following equation is obtained:

$$R_{YZ} - R_{XY} = (z-x)l \frac{R_3(R_2 - R_1)}{R_1 + R_2 + R_3} \quad \text{(c)}$$

The leakage resistance $R_1$, $R_2$ and $R_3$ vary with leakage conditions at the sulfuric acid leakage point P, the distance between the wiry electrodes, and the like. However, when three wiry electrodes are evenly twisted, the leakage resistance $R_1$ is equal to $R_2$ which is equal to $R_3$ such that these leakage resistances are approximated to one another. When the wiry electrodes X, Y and Z are disposed, as shown in FIG. 18, on the same plane at regular space intervals, it is considered that $R_1$ is equal to $R_2$. Accordingly, the value of the right side of the equation (c) is reduced to such extent as to be disregarded. The equation (c) is therefore converted into the following equation (d):

$$R_{YZ} - R_{XY} = (z-x)l \quad \text{(d)}$$

Here, the difference between z and x is known ($z \neq x$) and constant. For example, a constant-voltage power supply 31 is connected to the circuit such that the power supply 31 is selectively connected to the $N_X$ and $N_Y$ or to the $N_Y$ and $N_Z$ by a switch SW. In such arrangement shown in FIG. 18, the resistance values $R_{XY}$ and $R_{YZ}$ between the measuring ends above-mentioned can be obtained by measuring the values of currents flowing in the respective closed circuits by an ammeter 32. Then, the distance l between the measuring ends and the sulfuric acid leakage point P can be obtained according to the equation (d).

Since the leakage distance l is obtained with the value of the right side of the equation (c) disregarded, there occurs, between such leakage distance and the actual distance, a difference calculated according to the following equation (e):

$$\Delta l = \frac{R_3(R_2 - R_1)}{(R_1 + R_2 + R_3)(z-x)} \quad \text{(e)}$$

As apparent from the equation (e), this difference is favorably reduced, as the difference between $R_2$ and $R_1$ becomes smaller and as the difference between z and x becomes greater. As apparent from the equations (c) and (d), the distance between the measuring ends and the liquid leakage point can be obtained regardless of the resistance value per each unit length of the wiry electrode Y, i.e. y ohm/m.

In fact, there was made an example 1 of the liquid leakage detector line as shown in FIG. 17 (A) (hereinafter referred to as the seventh invention example), and this example comprises;

each respective wiry electrode X and Y including a 0.65 mm dia. annealed copper line 2 having conductor resistance of 0.052 ohm/m which was covered with a polyester enamel insulator layer 4 having a thickness 27.5 μm;

a wiry electrode Z including a 0.2 mm dia. nickel chromium line 2′ having conductor resistance of 34.4 ohms/m which was covered with a polyester enamel insulator layer 4 having a thickness of 16.0 μm;

a braided body layer having liquid non-absorbing properties 30 made of 2 groups of 16 units of 3 pieces of 0.10 mm dia. mono-filament polyethylene yarn braided for every 3 pieces with a twisting pitch of 10.7 mm, the braided body layer 30 being disposed at the outer periphery of each of the wiry electrodes X, Y and Z which are disposed substantially in parallel with each other; and a liquid-absorbent braided body layer 3 made of 2 groups of 24 units of 4 pieces of 0.085 mm dia. multi-filament Tetron yarn braided for every 4 pieces with a braiding pitch of 8.7 mm (percent coverage of 90%), the braided body layer 3 being disposed outside of an assembly of the wiry electrodes X, Y and Z.

Sulfuric acid having a concentration of 90 % was allowed to fall from a burette onto the seventh invention example at its measuring position of 200 m to produce leakage resistance between the wiry electrodes X, Y and Z. Then, the current values indicated by the ammeter 32 in the electric circuit in FIG. 18 were read to obtain the resistance values. The $R_{XY}$ and $R_{YZ}$ values were 420.74 ohms and 7274.71 ohms. The leakage distance l obtained according to the equation (d) was 199.545 m. Thus, the difference l between the leakage distance thus calculated and the actual distance is −0.455 m which is a practically tolerable error.

The description above-mentioned has been made in connection with three wiry electrodes, but the leakage detector line can be similarly embodied with four or more wiry electrodes. In the embodiment above-mentioned, the wiry electrode Z is made of a material different from that of other wiry electrodes to produce a different resistance value per unit length of the wiry electrode Z, from those of other wiry electrodes. However, the wiry electrodes may be formed with the conductors having different section areas.

Further, there may be readily formed an electric circuit for detecting the leakage of sulfuric acid in which the calculation according to the equation (d) is automatically carried out, and a digital display means may be combined with such electric circuit.

In accordance with the liquid leakage detector line of this embodiment, the leakage of a sulfuric acid or strong alkali liquid is absorbed by the liquid-absorbent braided body layer disposed at the outer periphery of the detector line. The leakage liquid thus absorbed is immediately introduced into the inner polyethylene braided body layer. The leakage liquid thus introduced causes the insulator layers covering the conductors to dissolve, thereby to reduce the insulation resistances between the wiry electrodes. The electric resistance values between the $N_X-N_Y$ and $N_Y-N_Z$ can be measured to detect the distance between the measuring ends and the leakage point within a practically tolerable error range.

It will be understood that, in view of the foregoing, other embodiments of the present invention (not shown in the drawings) can be readily adopted by those skilled in the art.

TABLE 1

| State of Liquid Leakage Detector Line | Examples | | | | | | | | | | | | | | |
|---|---|---|---|---|---|---|---|---|---|---|---|---|---|---|---|
| | First invention example | | | | | Comparative example I | | | | | Comparative example II | | | | |
| | Concentration of Sulfuric Acid (%) | | | | | | | | | | | | | | |
| | 97 | 90 | 80 | 75 | 70 | 97 | 90 | 80 | 75 | 70 | 97 | 90 | 80 | 75 | 70 |
| Dry | 4.0 | 5.5 | 8.5 | 9.0 | * | 8.7 | 2.8 | 1.7 | 6.1 | * | 2.2 | 3.9 | * | * | * |
| | 4.0 | 4.8 | 8.6 | 9.3 | * | * | 3.3 | 1.7 | 4.6 | * | 2.1 | 4.8 | * | * | * |
| | 4.5 | 5.0 | 7.5 | 9.5 | * | 5.5 | * | 1.9 | * | * | 2.5 | 6.6 | * | * | * |
| Wet | 0.5 | 2.0 | 3.5 | 10.5 | * | 0.4 | 2.6 | * | * | * | — | — | — | — | — |
| | 0.5 | 6.0 | 5.5 | 11.0 | * | 0.3 | 0.4 | * | * | * | — | — | — | — | — |
| | 0.5 | 4.5 | 5.5 | 9.5 | * | 0.5 | 0.6 | 1.2 | 19.0 | * | — | — | — | — | — |

*Not detected

TABLE 2

| State of Liquid Leakage Detection Line | Second invention example | | | | |
|---|---|---|---|---|---|
| | Concentration of Sulfuric Acid (%) | | | | |
| | 97 | 90 | 80 | 75 | 70 |
| Dry | 4.5 | 5.5 | 8.5 | 9.0 | Not detected |
| | 9.0 | 4.8 | 8.6 | 9.3 | Not detected |
| | 4.7 | 5.0 | 8.0 | 10.5 | Not detected |
| Wet | 0.5 | 1.0 | 1.2 | 8.5 | Not detected |
| | 0.5 | 5.5 | 2.7 | 5.1 | Not detected |
| | 0.5 | 3.0 | 1.5 | 13.6 | Not detected |

TABLE 3

| State of Liquid Leakage Detector Line | Third invention example | | | | |
|---|---|---|---|---|---|
| | Concentration of Sulfuric Acid (%) | | | | |
| | 97 | 90 | 80 | 75 | 70 |
| Dry | 6.0 | 7.5 | 9.5 | 11.5 | Not detected |
| | 5.5 | 5.5 | 9.0 | 10.3 | Not detected |
| | 8.5 | 5.0 | 8.5 | 11.5 | Not detected |
| Wet | 3.0 | 4.0 | 8.5 | 9.5 | Not detected |
| | 2.5 | 4.5 | 7.7 | 13.7 | Not detected |
| | 2.5 | 3.0 | 9.3 | 9.5 | Not detected |

What is claimed is:

1. A liquid leakage detector line comprising: a pair of wiry electrodes each including a conductor covered with an insulator layer made of a macromolecular material including an ester bond and adapted to dissolve in the presence of strong acids or alkalis, said wiry electrodes being disposed substantially in parallel with each other; and a liquid-absorbent material covering said pair of wiry electrodes.

2. A liquid leakage detector line as set forth in claim 1, wherein the liquid-absorbent material is a braided body layer made of liquid-absorbent yarn disposed outside of the wiry electrodes.

3. A liquid leakage detector line as set forth in claim 2, wherein the braided body layer includes an inner braided body layer made of synthetic fiber yarn having liquid non-absorbing properties and an outer braided body layer made of liquid-absorbent yarn.

4. A liquid leakage detector line as set forth in claim 2, wherein the pair of wiry electrodes are disposed through spacers.

5. A liquid leakage detector line as set forth in claim 4, wherein each of the spacers is a braided body layer made of synthetic fiber yarn having liquid non-absorbing properties, said spacer covering each of the wiry electrodes.

6. A liquid leakage detector line as set forth in claim 1, wherein the liquid-absorbent material is a braided body layer made of liquid-absorbent yarn disposed at the outer periphery of each of the wiry electrodes.

7. A liquid leakage detector line as set forth in claim 6, wherein the braided body layer includes an inner braided body layer made of synthetic fiber yarn having liquid non-absorbing properties and an outer braided body layer made of liquid-absorbent yarn.

8. A liquid leakage detector line as set forth in claim 6, wherein the pair of wiry electrodes each covered with a braided body layer, are disposed through one or more spacers.

9. A liquid leakage detector line as set forth in claim 8, wherein each spacer is a braided body layer made of synthetic fiber yarn having liquid non-absorbing properties, said spacer covering each of the wiry electrodes covered with a braided body layer.

10. A liquid leakage detector line comprising: a pair of wiry electrodes each including a conductor covered with an insulator layer made of a macromolecular material including an ester bond, said wiry electrodes being disposed substantially in parallel with each other through spacers, said spacers being a plurality of synthetic resin strings having liquid non-absorbing properties; and a liquid-absorbent material covering said pair of wiry electrodes, the liquid-absorbent material being a braided body layer made of liquid-absorbent yarn disposed outside of the wiry electrodes.

11. A liquid leakage detector line comprising: a pair of wiry electrodes each including a conductor covered with an insulator layer made of a macromolecular material including an ester bond, said wiry electrodes being disposed substantially in parallel with each other; a liquid-absorbent material covering said pair of wiry electrodes, the liquid-absorbent material being a braided body layer made of liquid-absorbent yarn disposed outside the wiry electrodes; and at least one liquid leakage position detector line which includes a conductor covered with an insulator layer made of an acid- and alkali-resisting material, said liquid leakage position detector line being disposed substantially in parallel with the pair of wiry electrodes.

12. A liquid leakage detector line as set forth in claim 11, wherein the pair of wiry electrodes and the liquid leakage position detector line are disposed inside of a braided body layer made of liquid-absorbent yarn.

13. A liquid leakage detector line as set forth in claim 11, wherein the braided body layer includes an inner braided body layer made of synthetic fiber yarn having liquid non-absorbing properties, and an outer braided body layer made of liquid-absorbent yarn.

14. A liquid leakage detector line as set forth in claim 11, wherein the pair of wiry electrodes are disposed through spacers.

15. A liquid leakage detector line comprising:
a pair of wiry electrodes each including a conductor covered with an insulator layer made of a macromolecular material including an ester bond, said wiry electrodes being disposed substantially in parallel with each other;
a liquid-absorbent material covering said pair of wiry electrodes, the liquid-absorbent material being a braided body layer made of liquid-absorbent yarn disposed outside of the wiry electrodes; and
at least one wiry electrode arranged similarly to the pair of wiry electrodes and disposed substantially in parallel therewith, and wherein all of said wiry electrodes do not have the same resistance values per unit length thereof.

16. A liquid leakage detector line comprising:
a pair of wiry electrodes each including a conductor covered with an insulator layer made of a macromolecular material including an ester bond, said wiry electrodes being disposed substantially in parallel with each other through one or more spacers, the spacers being disposed between said pair of wiry electrodes each covered with said braided body layer and the spacers being formed by a combination of a plurality of synthetic resin strings having liquid non-absorbing properties; and
a liquid-absorbent material covering each of said pair of wiry electrodes, the liquid-absorbent material being a braided body layer made of liquid-absorbent yarn disposed at the outer periphery of each of the wiry electrodes.

17. A liquid leakage detector line comprising:
a pair of wiry electrodes each including a conductor covered with an insulator layer made of a macromolecular material including an ester bond, said wiry electrodes being disposed substantially in parallel with each other;
a liquid-absorbent material covering said pair of wiry electrodes, the liquid-absorbent material being a braided body layer made of liquid-absorbent yarn disposed at the outer periphery of each of the wiry electrodes; and
at least one liquid leakage position detector line which includes a conductor covered with an insulator layer made of an acid- and alkali-resisting material, said liquid leakage position detector line being disposed substantially in' parallel with the pair of wiry electrodes each covered with a braided body layer.

18. A liquid leakage detector line comprising:
a pair of wiry electrodes each including a conductor covered with an insulator layer made of a macromolecular material including an ester bond, said wiry electrodes being disposed substantially in parallel with each other;
a liquid-absorbent material covering said pair of wiry electrodes, the liquid-absorbent material being a braided body layer made of a liquid-absorbent yarn disposed outside of the wiry electrodes; and
at least one wiry electrode arranged similarly to the pair of wiry electrodes and disposed substantially in parallel therewith, and wherein all of said wiry electrodes do not have the same resistance values per unit length thereof.

* * * * *